Figure 1:
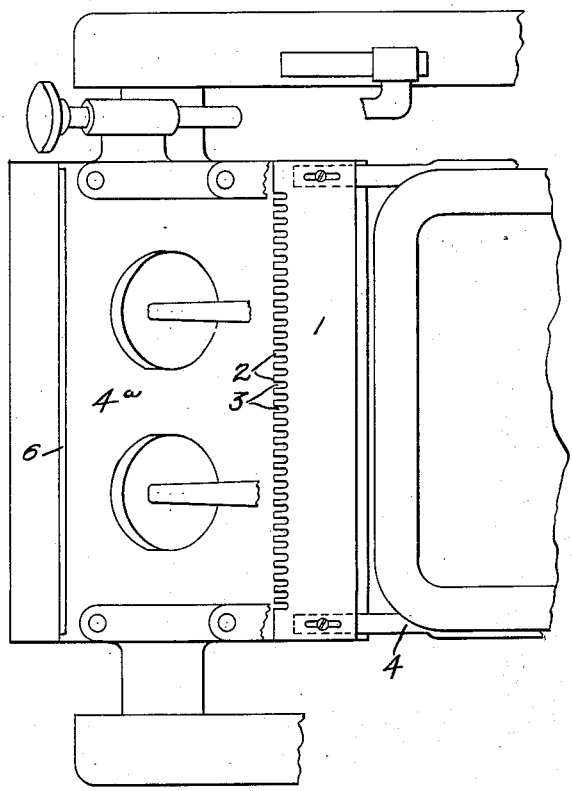

May 7, 1935.  G. B. EGGERT  2,000,513

OIL WIPER

Original Filed Feb. 16, 1933

INVENTOR.
GUSTAV B. EGGERT. Deceased
By BERNARD H. LISKOW. Admistrator.
By George C. Willcox
Attorney Patented May 7, 1935

2,000,513

UNITED STATES PATENT OFFICE 2,000,513

OIL WIPER

Gustav B. Eggert, deceased, late of Saginaw, Mich., by Bernard H. Liskow, administrator, Saginaw, Mich., assignor to Baker Perkins Company, Inc., Saginaw, Mich., a corporation of New York Original application February 16, 1933, Serial No. 657,040. Divided and this application March 5, 1934, Serial No. 714,067

3 Claims. (Cl. 107—15)

This application pertains to devices for feeding and spreading lubricating oil evenly over relatively reciprocating surfaces, and is a division of United States patent application of Gustav B. Eggert, Serial No. 657,040, filed February 16, 1933. The invention has for one object the provision of improved lubricating means for dough dividers having rotatably mounted heads which reciprocate on their axes between their dough-receiving and discharging positions as is more fully described in the patent application referred to above.

This has been accomplished by providing, in a rotary head dough divider of this kind, a scraper blade to gather and move a film of oil, fed onto the working face from a stationary reservoir, either into a second reservoir on the movable head, or to a point from which it can flow by gravity into said second reservoir.

A layer of oil is applied to the moving surface from the stationary reservoir or other feeding means, as the surface moves away from the reservoir, and on the reverse travel of the surface the scraper wipes the film of oil ahead of it until it flows into the oil receptacle or pocket in the moving head, whence it flows to lubricate the dough-measuring pockets and the pistons operating therein. Thus a definite limited quantity of oil is scraped from the face into the oil pocket on each complete oscillation of the head.

The invention has for a further object the provision of a scraper, co-operative with such a relatively reciprocating surface in dough dividers or other machines, which will gather and impel a supply of oil over the surface on its motion in one direction relative to the scraper, and on the reverse motion of the surface will travel over and past a freshly applied layer of oil to its original position ready to move the said fresh layer of oil over the surface.

Straight-edged oil scrapers do not entirely satisfactorily maintain their working relationship to the co-operative surfaces, and do not therefore scrape up and deliver at all times the same quantity of oil on each working stroke. As a result from time to time the machine parts either are under-lubricated or oil is wasted. The reason for this is that, on its reverse or non-working stroke, a blade of this type must pass over the oil film next to be acted on without scraping from the surface behind it any material quantity of the newly-spread layer of oil. To avoid this, the tension of the blade and its clearance from the surface on the reverse stroke must be precisely and delicately adjusted and regulated.

Bearing play, slight eccentricity of a cylindrical surface, and surface irregularities in operation of the machine set up vibration and oscillation which eventually disturb such delicate adjustment.

The object of the present invention is to obviate these difficulties by providing an improved blade which can be simply and inexpensively installed and which will operate satisfactorily for long periods without requiring readjustment.

The invention consists of a blade to be mounted in scraping relation to a relatively reciprocatory surface over which oil is to be moved, and having its working edge notched or toothed to permit free passage of an oil film between the blade and the surface during their relative motion in one direction, and on the reverse motion to scrape up and move the oil film over which the blade has previously passed.

The application of the invention to a rotary-head dough-divider is illustrated in the accompanying drawing and is described in detail below.

Referring to the drawing, Fig. 1 is a top plan view of the invention as applied to the dividing head of a dough divider. The teeth on the blade and the spaces between them are exaggerated to more clearly show their construction.

Figure 2:
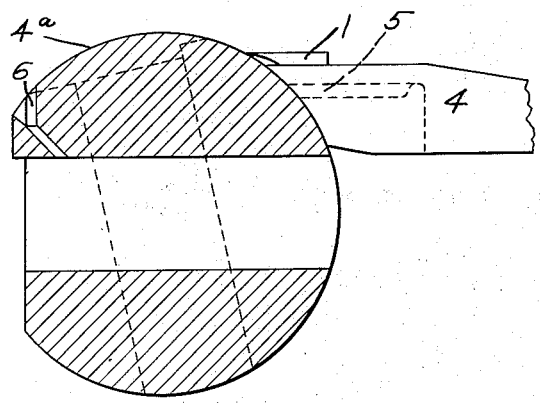

Fig. 2 is a diagrammatic side elevation of the dividing head and blade shown in Fig. 1.

Referring to Figs. 1 and 2, a scraper blade 1 having teeth 2 with gaps or notches 3 between them is mounted on the stationary machine frame 4 of the divider in scraping relation to the arcuate working surface of a rotary divider head 4a. The blade is caused to bear resiliently against the surface, by making it of spring steel, or by providing suitable spring mountings.

A reservoir 5 on the machine frame supplies oil to the working face of the head 4a, which at each counter-clockwise motion picks up a film of oil from the reservoir. During such counter-clockwise motion of the dividing head a substantial portion of the oil film flows through the notches 3 under and past the edge of the scraper blade 1, due to the direction of motion of the head and the angle between the blade and the surface. During the clockwise return motion of the head the previously deposited film of oil is scraped by the blade 1 to the left over the working surface until it flows into a receptacle 6 in the head, from which it flows to the pistons and other working parts.

Since the blade bears with constant pressure on the face of the head at all times, the same amount of oil passes under it on each counter-clockwise motion of the head. Therefore, equivalent quantities of oil are scraped into reservoir 6 during all clockwise motions of the head. In the case of the prior straight-edged blade means had to be provided in mounting the blade, or in other ways for causing the blade to clear the surface of the head on its counter-clockwise motion so that it "feathered" or passed over the layer of oil which it was to pick up and move on the subsequent clockwise stroke. The clearance had to remain constant to thousandths of an inch. To maintain this fine adjustment was mechanically very difficult. The present invention avoids this difficulty and at the same time is very simple in construction and mounting.

While there is shown and described an improved blade applied to the reciprocating head of a dough divider, it is capable of modification both in construction and the purposes to which it may be put without departing from the spirit of the invention. For example, it is equally adapted to use with any reciprocating surfaces, plane or cylindrical, of other machines. Also, various modifications of the blade edge may be made, as in the spacing, shape and size of the notches in the scraping edge, as may be determined by the consistency of the lubricant and the amount to be scraped from the surface at each working stroke.

The essential and novel feature is that apertures or notches are provided in the working edge through which oil can flow, avoiding the necessity for a feathering action of the blade as was heretofore the case.

Nor is it essential that the stationary wiper be used in co-operation with a reciprocatory surface. It is equally applicable to installations in which the blade reciprocates over a stationary surface to which oil is fed, or in which both the surface and blade may reciprocate relatively to each other.

Having thus described the invention, what is claimed and desired to secure by Letters Patent is:

1. In a dough divider having a dividing head mounted for rotary reciprocation, an oil reservoir in said head, a stationary oil reservoir arranged to feed a film of oil onto the working face of said head during its motion in one direction, and a stationary scraper positioned between said reservoirs in co-operative relationship to the working face of the head to impel the oil of said film into the reservoir in said head during its motion in the opposite direction.

2. In combination with a reciprocatory surface to which a layer of oil is fed, a blade mounted in scraping relation to said surface and having its edge notched to permit passage of said oil layer between the surface and blade more freely during the motion of said surface in one direction than in the other.

3. An oil scraper blade for mounting in scraping relationship to a relatively reciprocatory surface, having its scraping edge provided with a plurality of notches.

BERNARD H. LISKOW,
*Administrator of the Estate of Gustav B. Eggert, Deceased.*